(12) United States Patent
Nagata et al.

(10) Patent No.: US 6,909,681 B2
(45) Date of Patent: Jun. 21, 2005

(54) OPTICAL DISK AND OPTICAL DISK APPARATUS

(75) Inventors: Masayoshi Nagata, Kanagawa (JP); Yasuo Tone, Tokyo (JP); Ikuhiro Hideta, Miyagi (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 10/132,948

(22) Filed: Apr. 26, 2002

(65) Prior Publication Data

US 2002/0191520 A1 Dec. 19, 2002

(30) Foreign Application Priority Data

Apr. 27, 2001 (JP) ........................................ 2001-132280

(51) Int. Cl.[7] .............................................. G11B 7/00

(52) U.S. Cl. .................................. 369/59.1; 369/59.23

(58) Field of Search .......................... 369/59.1, 59.11, 369/59.22, 59.23

(56) References Cited

U.S. PATENT DOCUMENTS 4,615,024 A * 9/1986 Usui .......................... 369/59.1

* cited by examiner

*Primary Examiner*—Nabil Hindi
(74) *Attorney, Agent, or Firm*—Frommer Lawrence & Haug LLP; William S. Frommer (57) ABSTRACT

In an optical disk, address information, including an address information start mark, is recorded in a header region primarily based on variable-length codes such that, between each pair of nearest bits having a first logic value, at least two and at most seven bits having a second logic value are disposed. The address information start mark is detected based on a first criterion that a combination of pulse widths each defined in association with a nearest pair of bits having the first logic value is present in a pulse sequence, and also based on a second criterion that, when the logic level of the pulse sequence alternates between a first logic level and a second logic level in association with occurrence of bits having the first logic value intermittently disposed among bits having the second logic value, the logic levels of pulses in the pulse sequence coincide with their respective counterparts in the combination of pulse widths.

8 Claims, 5 Drawing Sheets

OPTICAL DISK AND OPTICAL DISK APPARATUS

BACKGROUND OF THE INVENTION

1. Field of the Invention

The present invention relates to optical disks and optical disk apparatuses, and more specifically to an optical disk and an optical disk apparatus in which an address information start mark is detected from a header region.

2. Description of the Related Art

An optical disk has a plurality of sectors constituting tracks arranged spirally or concentrically. Each sector has a recording region for recording user data, and a header region preceding the recording region, in which address information regarding the position of the sector is recorded. Thus, an optical disk apparatus is required to read the address information recorded in the header region before playing back the user data recorded in the recording region of the optical disk.

In order to acquire the address information, the optical disk apparatus needs to first detect an address mark in the header region, indicating the beginning of the address information, which serves to achieve synchronization when the address information is read.

For example, let it be supposed that a logic HIGH level corresponds to a space and a logic LOW level corresponds to a mark. In the following description, the pulse width of a playback clock of the optical disk apparatus will be denoted as "T". For example, an address mark AM is represented by a first recording pulse sequence 106 consisting of a mark sequence having a pulse width of 6T and a second recording pulse sequence 109 consisting of a space sequence having a pulse width of 9T, as shown in the lower part of FIG. 6A.

Figure 6A:
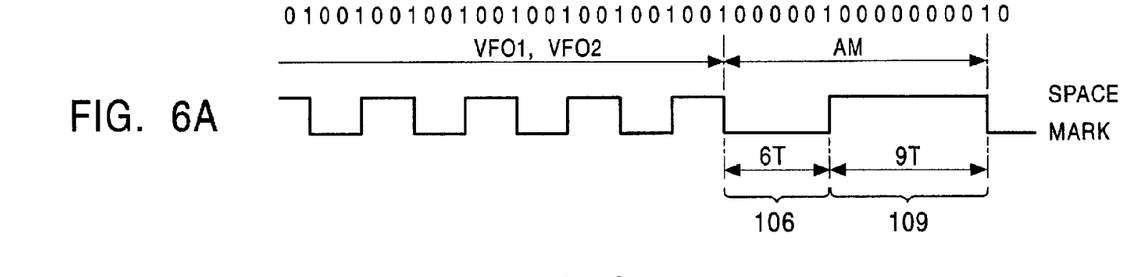
FIGS. 6A to 6C are diagrams showing examples of bit sequence and recording pulse sequence.

In the following description, a "recording pulse sequence" refers to a sequence of pulses obtained by NRZI (Non Return to Zero Inverted) modulating a bit sequence of variable-length codes. For example, a recording pulse sequence shown in the lower part of FIG. 6A is obtained by NRZI modulating a bit sequence of variable-length codes shown in the upper part of FIG. 6A. In the following description, the pulse width of contiguous spaces in a recording pulse sequence will be referred to as a "space length", and the pulse width of contiguous marks in a recording pulse sequence will be referred to as a "mark length".

More specifically, the first recording pulse sequence 106 and the second recording pulse sequence 109 are obtained by NRZI modulating the bit sequence shown in the upper part of FIG. 6A, i.e., inverting at each "1" and not inverting at "0"s.

A conventional optical disk apparatus, when detecting an address mark AM, converts the data written (pre-recorded on the optical disk) as shown in the lower part of FIG. 6A back into the format shown in the upper part of FIG. 6A. The detection criterion for detecting the address mark AM has been such that when a portion of a bit sequence is detected as representing a "combination of space length and mark length" corresponding to the address mark AM, the portion of the bit sequence is determined as the address mark AM.

The conventional detection criterion for the conventional optical disk apparatus to detect the address mark AM, however, has had the following shortcomings.

Figure 6B:
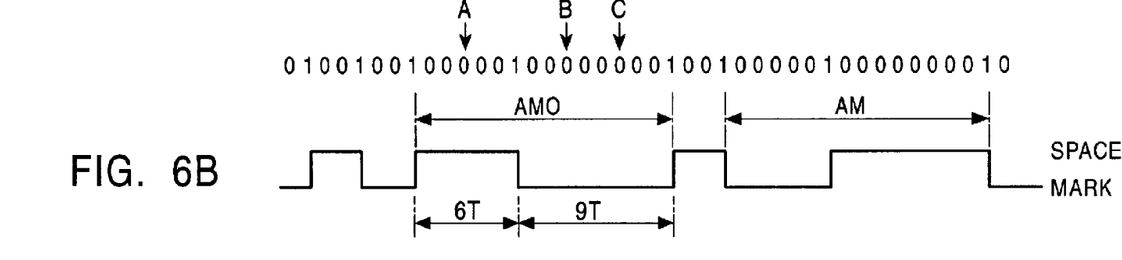

For example, if bit errors occur in the bit sequence shown in the upper part of FIG. 6A at three points A, B, and C as shown in FIG. 6B, the bit sequence shown in the upper part of FIG. 6B includes a false address mark AMO consisting of the same combination of space length and mark length as that of the address mark AM, as shown in the lower part of FIG. 6B. When such a false address mark AMO is present, the optical disk apparatus detects the false address mark AMO before detecting the true address mark AM that is supposed to be detected.

Figure 6C:
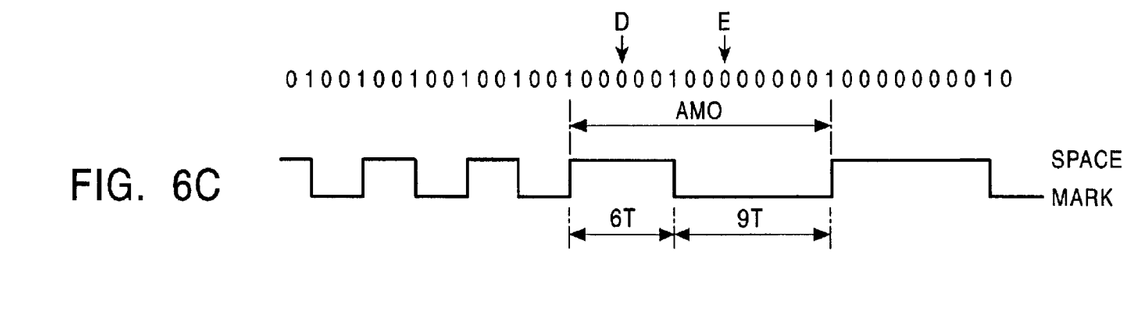

As another example, if bit errors occur in the bit sequence shown in the upper part of FIG. 6A at two points D and E as shown in FIG. 6C, the bit sequence shown in the upper part of FIG. 6C includes a false address mark AMO consisting of the same combination of space length and mark length as that of the address mark AM, as shown in the lower part of FIG. 6C. Similarly to the previous example, when such a false address mark AMO is present, the optical disk apparatus detects the false address mark AMO before detecting the true address mark AM that is supposed to be detected. Thus, the conventional optical disk apparatus sometimes fails to accurately play back user data from the recording region.

SUMMARY OF THE INVENTION

The present invention has been made in order to overcome the above shortcomings, and an object thereof is to provide an optical disk and an optical disk apparatus in which an address information start mark in a header region is accurately detected.

To this end, the present invention, in one aspect thereof, provides an optical disk having a plurality of sectors constituting tracks arranged spirally or concentrically, each of the plurality of sectors including a recording region for recording user data, and a header region for recording address information including at least one address information start mark for synchronizing with a beginning of address information regarding the position of the sector, the address information start mark being represented by a sequence of pulses having a first logic level and pulses having a second logic level which is an inverse of the first logic level. The address information is recorded in the header region primarily based on variable-length codes such that, between each pair of nearest bits having a first logic value, at least two and at most seven bits having a second logic value are disposed, the address information start mark being recorded based on either a code permitted for the rest of the address information or a code not permitted for the rest of the address information. The address information start mark is detected based on a first detection criterion that a combination of pulse widths each defined in association with a nearest pair of bits having the first logic value is present in a pulse sequence, and also based on a second detection criterion that, when the logic level of the pulse sequence alternates between the first logic level and the second logic level in association with occurrence of each of a plurality of bits having the first logic value intermittently disposed among a plurality of bits having the second logic value, the logic levels of a number of pulses in the pulse sequence respectively coincide with the logic levels of the corresponding pulses constituting the combination of pulse widths.

According to the above arrangement, the address information start mark is detected based on the first detection criterion and also based on the second detection criterion.

Now consider a sequence of pulses having the same combination of pulse widths as that of the address information start mark, but the logic levels of pulses constituting the pulse widths being inverses of their respective counterparts.

In this case, the combination of pulse widths is incorrectly detected as the address information start mark with only the first detection criterion; however, the second detection criterion is used in addition, i.e., the logic levels of pulses constituting the combination of pulse widths are also detected.

Thus, the logic levels of the pulses constituting the combination of pulse widths are recognized as being inverses of their respective counterparts in the combination corresponding to the address information start mark.

Accordingly, the address information start mark is accurately detected from the header region of the optical disk, serving to record/play back used data accurately in/from the recording region.

Preferably, a pulse width of contiguous pulses having the first logic level is in a range of five to nine units of the pulse width of a single pulse having the first logic level, and a pulse width of contiguous pulses having the second logic level is nine units of the pulse width of a single pulse having the second logic level.

According to the above arrangement, the address information start mark is detected even more accurately from the header region of the optical disk.

Also preferably, whether the combination of pulse widths is present is determined with consideration also given to the logic levels of pulses associated with a region preceding the address information start mark.

According to the above arrangement, when a bit sequence detected presumably as the address information start mark is associated with the preceding region, the bit sequence is not determined as the address information start mark. Thus, the address information start mark is detected even more accurately from the header region of the optical disk.

More preferably, wherein a pulse having the first logic level, associated with the preceding region and nearest to pulses associated with the address information start mark, and a pulse having the first logic level, associated with the address information start mark and nearest to pulses associated with the preceding region, are separated by five units of the pulse width of a single pulse having the second logic level, and the address information start mark consists of one byte in total.

According to the above arrangement, the address information start mark, consisting of one byte, is detected with consideration given also to a portion of the preceding region, so that incorrect detection of the address information start mark is suppressed. Thus, the optical disk is not required to use an address information start mark that is easy to detect but redundant in the length of detection pattern, and is allowed to use an address information start mark of a shorter pattern length. Accordingly, the optical disk achieves a reduced data redundancy and more efficient use of disk capacity.

The present invention, in another aspect thereof, provides an optical disk apparatus for playing back data from an optical disk having a plurality of sectors constituting tracks formed spirally or concentrically, each of the plurality of sectors including a recording region for recording user data, and a header region for recording address information including at least one address information start mark for synchronizing with a beginning of address information regarding the position of the sector, the address information start mark being represented by a sequence of pulses having a first logic level and pulses having a second logic level which is an inverse of the first logic level. The optical disk detects the address information start mark from the header region of the optical disk, and plays back the user data recorded in the recording region based on the address information obtained by synchronizing with the detected address information start mark. The address information start mark is detected based on a first detection criterion that a combination of pulse widths each defined in association with a nearest pair of bits having the first logic value is present in a pulse sequence, and also based on a second detection criterion that, when the logic level of the pulse sequence alternates between the first logic level and the second logic level in association with occurrence of each of a plurality of bits having the first logic value intermittently disposed among a plurality of bits having the second logic value, the logic levels of a number of pulses in the pulse sequence respectively coincide with the logic levels of the corresponding pulses constituting the combination of pulse widths.

According to the above arrangement, the address information start mark is detected based on the first detection criterion and also based on the second detection criterion.

Now consider a sequence of pulses having the same combination of pulse widths as that of the address information start mark, but the logic levels of pulses constituting the pulse widths being inverses of their respective counterparts. In this case, the combination of pulse widths is incorrectly detected as the address information start mark with only the first detection criterion; however, the second detection criterion is used in addition, i.e., the logic levels of pulses constituting the combination of pulse widths are also detected.

Thus, the logic levels of the pulses constituting the combination of pulse widths are recognized as being inverses of their respective counterparts in the combination corresponding to the address information start mark.

Accordingly, the address information start mark is accurately detected from the header region of the optical disk, serving to record/play back used data accurately in/from the recording region.

Preferably, a pulse width of contiguous pulses having the first logic level is in a range of five to nine units of the pulse width of a single pulse having the first logic level, and a pulse width of contiguous pulses having the second logic level is nine units of the pulse width of a single pulse having the second logic level.

According to the above arrangement, the address information start mark is detected even more accurately from the header region of the optical disk.

Also preferably, whether the combination of pulse widths is present is determined with consideration also given to the logic levels of pulses associated with a region preceding the address information start mark.

According to the above arrangement, when a bit sequence detected presumably as the address information start mark is associated with the preceding region, the bit sequence is not determined as the address information start mark. Thus, the address information start mark is detected even more accurately from the header region of the optical disk.

More preferably, wherein a pulse having the first logic level, associated with the preceding region and nearest to pulses associated with the address information start mark, and a pulse having the first logic level, associated with the address information start mark and nearest to pulses associated with the preceding region, are separated by five units of the pulse width of a single pulse having the second logic level, and the address information start mark consists of one byte in total.

According to the above arrangement, the address information start mark, consisting of one byte, is detected with consideration given also to a portion of the preceding region, so that incorrect detection of the address information start mark is suppressed. Thus, the optical disk is not required to use an address information start mark that is easy to detect but redundant in the length of detection pattern, and is allowed to use an address information start mark of a shorter pattern length. Accordingly, the optical disk achieves a reduced data redundancy and more efficient use of disk capacity.

DESCRIPTION OF THE PREFERRED EMBODIMENT

A preferred embodiment of the present invention will now be described with reference to the accompanying drawings.

Although the preferred embodiment of the present invention will be described below with various technically preferred limitations, the scope pf the present invention is not limited thereto unless otherwise explicitly stated.

Figure 1:
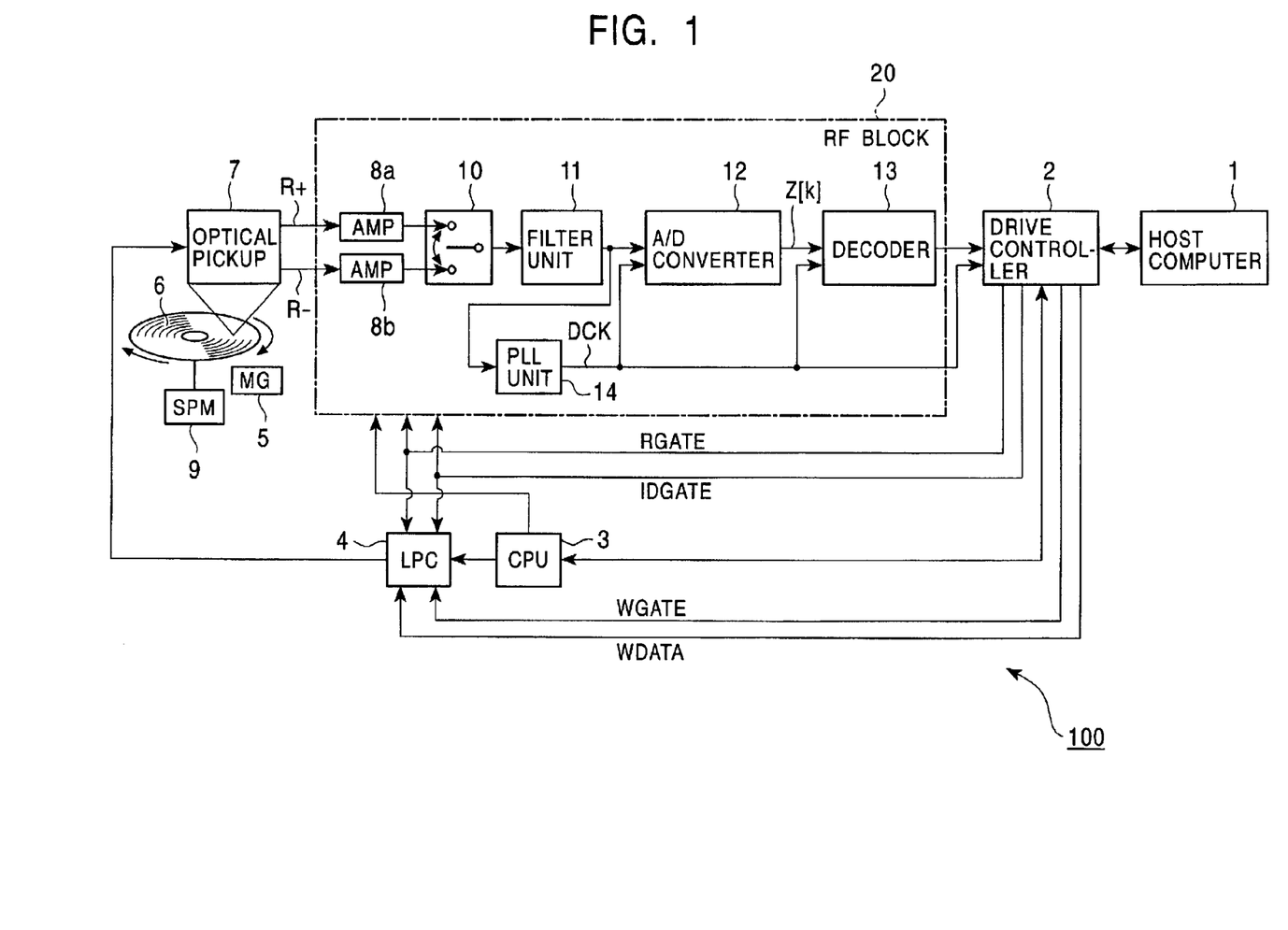
FIG. 1 is a block diagram showing an example electrical configuration of an optical disk apparatus for recording and/or playing back user data on/from an optical disk according to an embodiment of the present invention.

FIG. 1 is a block diagram showing an example electrical configuration of an optical disk apparatus 100 for recording and/or playing back user data on/from an optical disk 6 according to a preferred embodiment of the present invention. FIG. 1 mainly shows an example electrical configuration only of a system for processing recording/playback signals, omitting electrical configurations of other parts including a servo system.

The optical disk 6 has a plurality of sectors constituting tracks, for example, arranged spirally. Alternatively, the optical disk 6 may has a plurality of sectors constituting tracks, for example, arranged concentrically.

The optical disk 6 is rotated, for example, by a spindle motor (SPM) 9 so that information can be recorded and/or played back on/from the sectors by operations of an optical pickup 7 and a magnetic head (MG) 5.

The positions of the optical pickup 7 and the magnetic head 5 (seek, tracking servo, sled servo) at the time of recording/playback, focus servo for laser beams from the optical pickup 7, and rotation servo for the spindle motor 9 are controlled by a servo system not shown.

A drive controller (hereinafter referred to as "controller") 2 performs various control operations as a master controller of the optical disk apparatus 100, and also performs communications with a host computer 1. More specifically, the controller 2 controls recording of supplied user data on the optical disk 6 according to a recording instruction from the host computer 1.

Also, the controller 2 controls reading of user data from the optical disk 6 as required according to an instruction from the host computer 1, transferring the user data to the host computer 1. Furthermore, the controller 2 has the functions of encoding and decoding user data. A CPU 3 controls various relevant parts for recording/playback according to instructions from the controller 2.

At the time of recording, the controller 2 receives user data to be recorded according to an instruction from the host computer 1, and encodes the input data constituting information word in NRZ (Non Return to Zero) format to generate variable-length codes, for example, RLL (Run Length Limited) codes.

The RRL coding is a type of variable-length coding, in which the number of "0"s between each pair of "1"s is limited. The RLL coding satisfies coding requirements in respects of improving recording density and ensuring stable playback operation.

For example, the optical disk apparatus 100 uses RLL (1, 7) coding for data portion of the optical disk 6 while using RLL (2, 7) coding for preformatted address portion. The RLL (2, 7) coding encodes data such that the number of "0"s between nearest "1"s is at least two and at most seven. That is, according to the RLL (2, 7) coding, one of pit sequences "1001", "10001", "100001", "1000001", "10000001", and "100000001" is generated. By using the RLL (2, 7) coding, a recording pulse sequence constituting an address mark to be described later can be made longer, facilitating distinction from other recording pulse sequences. Thus, an address information start mark can be detected accurately, and a margin is provided at the time of playback.

The user data is thus converted according to the coding method into codeword to be recorded. It is to be understood that other suitable coding methods may be selected in accordance with the characteristics of a recording medium, method of recording/playback, etc.

The optical disk apparatus 100 according to this embodiment performs recording on the optical disk 6 by pulse width modulation (PWM). In order to perform recording by pulse width modulation, the RLL (2, 7) codes are NRZI (Non Return to Zero Inverted) modulated into recording data WDATA shown in FIG. 1, which is supplied to a laser power control unit (hereinafter referred to as "LPC") 4. The controller 2 supplies a WGATE signal to the LPC 4, instructing a light emitting operation in a recording mode and a timing of the operation.

The LPC 4 generates a laser driving current so that the optical pickup 7 emits a laser beam at the time of playback, recording, and erasure. The level of a laser beam at the time of recording and/or playback (or erasure), i.e., the amount of laser driving current, is determined according to an instruction from the CPU 3.

When recording is instructed by the WGATE signal, the LPC 4 controls the power of the laser beam emitted by the optical pickup 7 in accordance with the recording data WDATA supplied, forming pit sequences having magnetic polarities on the optical disk 6 for recording.

At the time of recording, the magnetic head 5 applies a bias magnetic field on the optical disk 6. More specifically, "mark edge recording," which will be described later, is performed according to precode output generated based on the recording data in a manner to be described later.

Now, a method of forming each pit on the optical disk 6 in accordance with a corresponding bit in the precode output, which is generated based on the recording data in a manner to be described later, will be described. A recording method in which, for example, a pit is formed in association with a "1" in the precode output ("space") and no pit is formed in association with a "0" ("mark") will be referred to as a "mark position recording method." In the following description, a length of contiguous spaces will be referred to as a "space length," and a length of contiguous marks will be referred to as a "mark length."

On the other hand, a recording method in which, each boundary between space and mark, represented by a pulse edge, is formed in association with, for example, a "1" in the precode output will be referred to as "mark edge recording method." At the time of playback, each bit boundary in a playback signal is recognized based on a playback clock DCK generated by a PLL unit 14, as will be described later.

At the time of playback, the following operations are performed under the control of the controller 2 and the CPU 3.

The controller 2 supplies an RGATE signal and an IDGATE signal to the LPC 4 and to an RF block 20 so as to control playback operation. More specifically by the RGATE signal, the controller 2 instructs the LPC 4 to continuously emit a laser beam at a power level for playback, and also instructs a playback process to the RF block 20.

As will be described later, the sector format of the optical disk 6 includes an address portion constituting a header region and a data portion constituting a recording region. The IDGATE signal instructs timing of operations in each of the regions, so that the LPC 4 and the RF block 20 operate accordingly.

First, the LPC 4 generates a laser driving current in accordance with the RGATE signal, so that the optical pickup 7 emits a laser beam for playback operation. The optical pickup 7 irradiates the optical disk 6 with the laser beam, and receives a light reflected therefrom. The optical pickup 7 generates various signals by signal operations in accordance with the amount of the reflected light. The signals include, for example, a sum signal R+, a difference signal R−, and a focus error signal, tracking error signal, etc. that are not shown.

The sum signal R+ undergoes gain adjustment by an amp 8a and then supplied to a switch 10. The difference signal R− undergoes gain adjustment by an amp 8b and then supplied to the switch 10. The gain settings in the amps 8a and 8b are made by the CPU 3. The focus error signal and the tracking error signal are supplied to a servo system not shown and used for servo control.

The switch 10 performs switching operation in accordance with the IDGATE signal, supplying the sum signal R+ or the difference signal R− to a filter unit 11. More specifically, in the sector format of the optical disk 6, which will be described later, the sum signal R+ is supplied to the filter unit 11 during a period in which a playback signal is supplied from the address portion to the switch 10. On the other hand, the difference signal R− is supplied to the filter unit 11 during a period in which a playback signal is supplied from the recorded data portion to the switch 10.

The filter unit 11 includes, for example, a low-pass filter for removing noise, and a waveform equalizer. A signal input from the switch 10 to the filter unit 11 is equalized so that partial response characteristics suitable for decoding by a subsequent decoder 13, for example, Viterbi decoding, will be achieved.

The A/D converter 12 performs A/D (Analog to Digital) conversion on the output of the filter unit 11 based on the playback clock DCK, outputting a playback signal value z[k].

The decoder 13 generates decoded data based on the playback signal value z[k], for example, by the above decoding method. The decoding method is used to decode the playback signal value z[k] reproduced from the data having been recorded by a combination of the RLL coding, for example, RLL (2, 7) coding, and the mark edge recording method described earlier. The decoded data is the most likely decoded sequence of the recording data.

The decoded data is supplied to the controller 2. As described earlier, the recording data is codeword generated by coding user data, for example, channel coding. Thus, assuming a sufficiently low decoding error rate, the decoded data can be regarded as the recording data in the form of codeword. The controller 2 applies a decoding process corresponding to the coding process such as channel coding, thereby playing the back user data, etc.

The playback clock DCK for the playback process is generated by a PLL unit 14. That is, the output of the filter unit 11 is also supplied to the PLL unit 14, so that the PLL unit generates the playback clock DCK by a PLL operation on the signal supplied.

The playback clock DCK is supplied to the A/D converter, the decoder 13, the controller 2, etc., so that they operate at timings based on the playback clock DCK. Furthermore, the playback clock DCK is also supplied to a timing generator not shown. The timing generator generates a signal for controlling timing of operations of the apparatus, such as switching of recording/playback operations.

The optical disk apparatus 100 is constructed as above, and the description will now be directed to the sector format of the optical disk 6.

Figure 2:
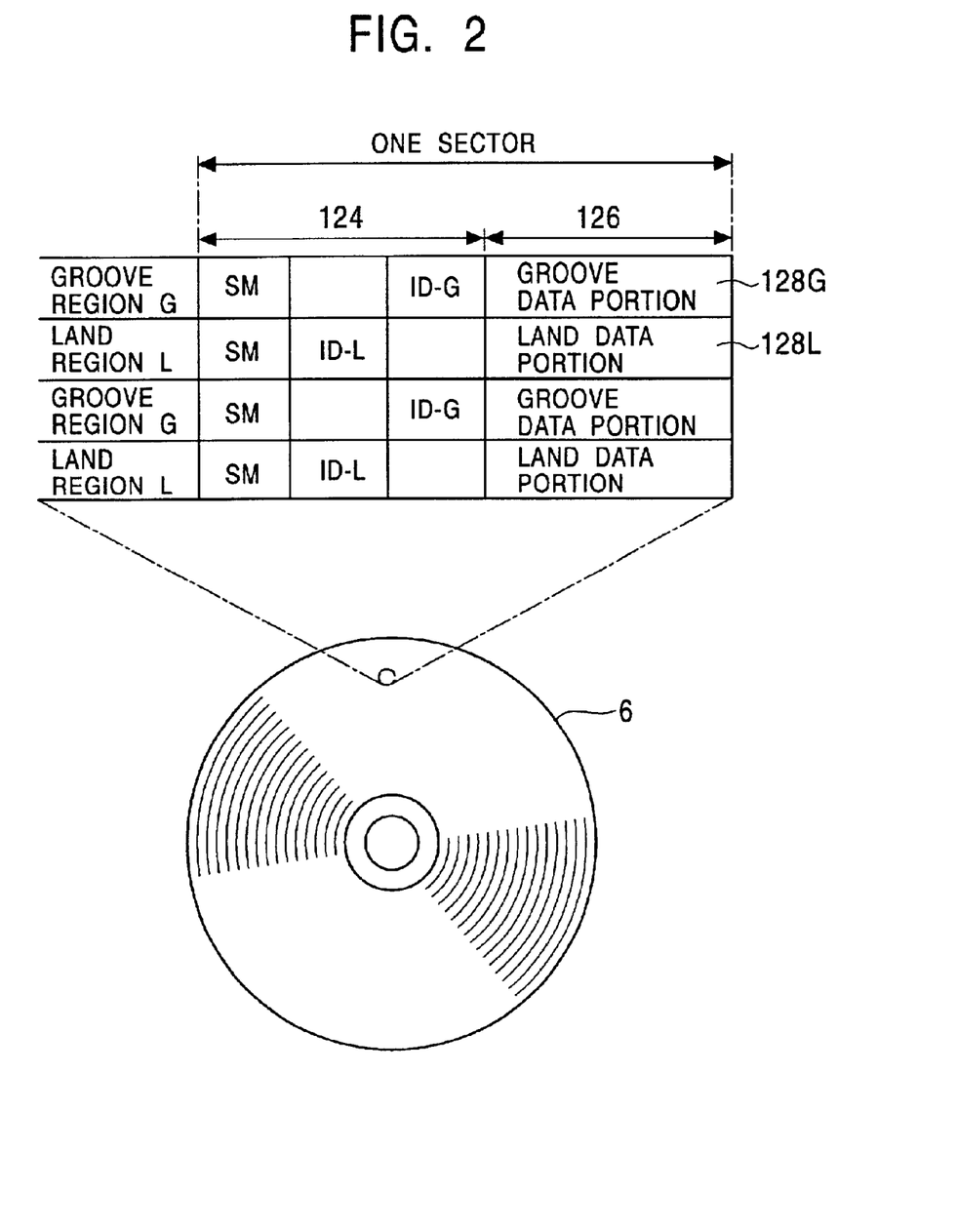
FIG. 2 is a diagram showing an example of the optical disk in FIG. 1 and sector format thereof.
Figure 3:
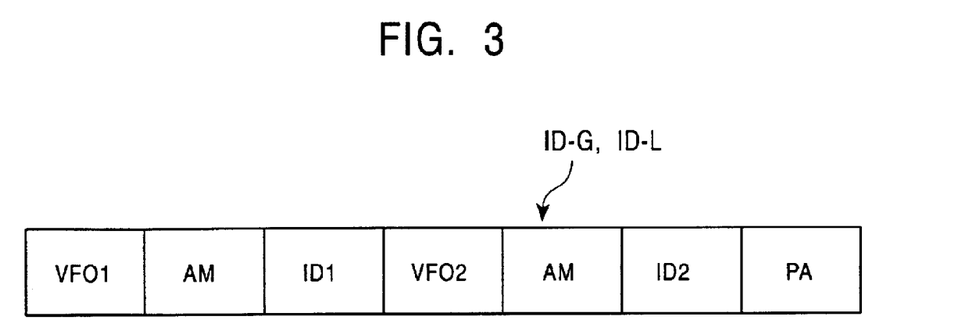
FIG. 3 is a diagram showing an example format of an address portion in FIG. 2.

FIG. 2 is a diagram showing an example of the optical disk 6 shown in FIG. 1 and sector format thereof. FIG. 3 is a diagram showing an example format of an address portion 124 shown in FIG. 2.

In the optical disk 6 shown in FIG. 2, user data is recorded on the basis of each sector as the unit of recording/playback. Sectors are provided, for example, in groove regions G and land regions L, and each of the sectors in the groove regions G and the land regions L includes an address portion 124 constituting a header region and a data portion 126 constituting a recording region.

A sector in a groove region G includes a sector space SM and a groove ID field ID-G constituting the address portion 124, and a groove data portion 128G constituting the data portion 126. A sector in a land region L includes a sector space SM and a land ID field ID-L constituting the address portion 124, and a land data portion 128L constituting the data portion 126.

The address portion 124 includes a sector space SM, a VFO field VFO1, an address mark AM (address information start mark), an ID field ID1 (address information), a VFO field VFO2, an address mark AM, an ID field ID2, and a postamble PA, arranged in that order, as shown in FIG. 3. The address portion 124 is preformatted by forming pits, for example, by emboss processing, and it functions as a header region.

The sector space SM has a pattern that does not occur in RLL (2, 7) codes, formed by emboss processing, so that it allows recognition of the beginning of the sector. The VFO fields VFO1 and VFO2 each serve as a PLL lead-in region, serving for synchronization of a VFO (Variable Frequency Oscillator) in the PLL unit 14 described earlier. The VFO fields VFO1 and VFO2 are formed by emboss processing in the address portion 124.

Furthermore, the VFO fields VFO1 and VFO2 each includes a pattern in which two "0"s appear between channel bits of "1"s (3T pattern). Thus, letting a time corresponding to the duration of a single channel bit (length of a single period of the playback clock) be denoted by T, in playback signals associated with the VFO fields VFO1 and VFO2, the signal level (logic level) is inverted every 3T.

The address mark AM has an embossed pattern that does not occur in RLL (2, 7) codes, so that it serves to achieve byte synchronization for the subsequent ID field ID1, etc. in the apparatus. Furthermore, the address mark AM indicates the beginning of the ID field IF1, etc., for example, by a pattern including a combination of a first recording pulse sequence 106 and a second recording pulse sequence 109, as shown in FIGS. 6A to 6C.

The following description will be made by way of example assuming that the pulse width of the first recording pulse sequence 106 is 6T and the pulse width of the second recording pulse sequence 109 is 9T.

The optical disk 6 is characterized in that the address mark AM is detected based not only on a first detection criterion that the address mark AM is a combination of the first recording pulse sequence 106 and the second recording pulse sequence 109. More specifically, in the optical disk 6, in addition to the first detection criterion, the address mark AM is detected also based on a second criterion that the logic levels of the first recording pulse sequence 106 and the logic levels of the second recording pulse sequence 109 correspond to marks and spaces, respectively.

The ID fields ID1 and ID2 each include information regarding the sector address, i.e., track number and sector number, and a CRC byte for detecting error in the information. The ID fields ID1 and ID2 includes sector address information, for example, the same data with each other. That is, an address is recorded twice in one sector. The postamble PA includes a pattern in which channel bits of "0"s and "1"s alternate (2T pattern).

Figure 4:
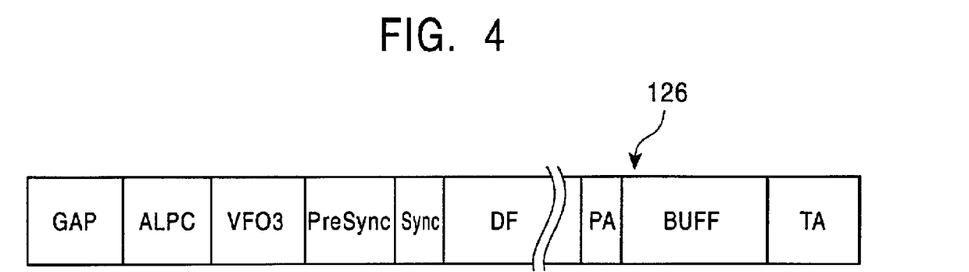
FIG. 4 is a diagram showing an example format of data portion in FIG. 2.

On the other hand, the data portion 126 shown in FIG. 2 includes a gap field GAP, a laser adjustment field ALPC, a VFO field VFO3, a presync field PreSync, a sync field Sync, a data field DF, a postamble PA, a buffer field BUFF, and a terminal TA, arranged in that order, as shown in FIG. 4.

The gap field GAP is a gap region provided between the address portion 124 and the laser adjustment field ALPC. The laser adjustment field ALPC is an adjustment region for raising the power of laser beam to a stable state.

The VFO field VFO3 is a PLL lead-in region, which serves to achieve synchronization for the VFO in the PLL unit 14 described earlier. The VFO field VFO3 is recorded when a recording operation is performed on the sector.

Furthermore, the VFO field VFO3 includes a pattern in which a "0" appears between channel bits of "1"s (2T pattern). Thus, in a playback signal associated with the VFO field VFO3, the signal level is inverted every pulse width of 2T.

The presync field PreSync includes a predetermined pattern that serves to achieve synchronization for detection for the sync field Sync. The sync field Sync, having the predetermined sync pattern, also serves to achieve byte synchronization for the subsequent data field DF. The data field DF is a recording region for recording user data.

The postamble PA has substantially the same function as the postamble PA in the address portion 124 described earlier. The buffer field BUFF is a region for absorbing variations in, for example, sampling frequency and rotation rate of the spindle motor 9 for rotating the optical disk 6. The terminal TA indicates the end of the sector.

The description will now be directed to a feature of the optical disk apparatus 100.

The optical disk apparatus 100 is characterized in that the address mark AM is detected based not only on the first detection criterion of whether a combination of space length and mark length detected in the read data RD coincides with the combination corresponding to the address mark AM. That is, the optical disk apparatus 100 detects the address mark AM based not only on the combination of space length and mark length.

More specifically, in addition to the first detection criterion, the optical disk apparatus 100 detects the address mark AM based on the second detection criterion of whether the logic levels of the detected combination, each corresponding to a mark or a space, coincide with the logic levels of an address mask pattern corresponding to a combination of spaces and marks.

Thus, even if a detected combination of space length and mark length coincides with the combination of space length and mark length corresponding to the address mark AM, the optical disk apparatus 100 does not immediately determines it as the address mark AM. That is, in addition to using the first detection criterion, the optical disk apparatus 100 is capable of referencing the logic levels of pulses associated with the space length to determine whether the pulses actually correspond to spaces, and of referencing the logic levels of pulses associated with the mark length to determine whether the pulses actually correspond to marks. This function is implemented in the controller 2 shown in FIG. 1.

Figure 5:
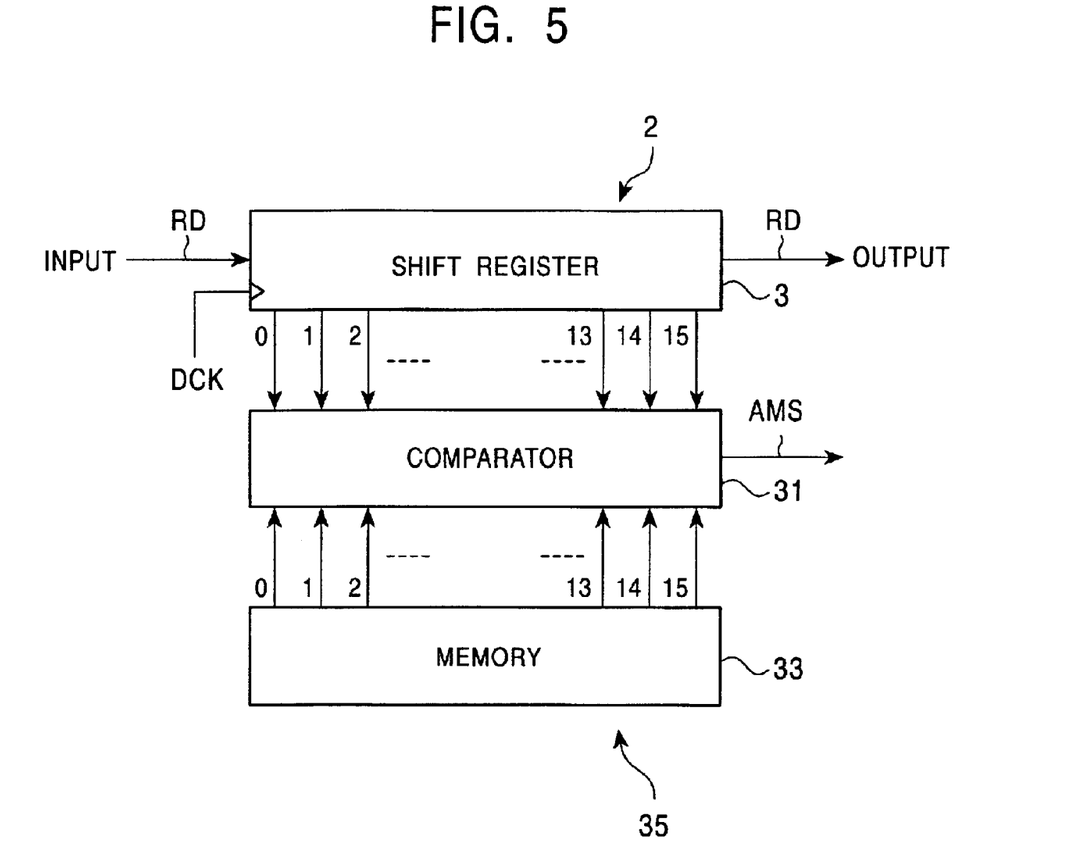
FIG. 5 is a block diagram sowing an example construction of a part of a controller in FIG. 1.

FIG. 5 is a block diagram showing the construction of a part of the controller 2 shown in FIG. 1.

The controller 2 includes a shift register 3, a comparator 31, and a memory 33.

The memory 33 is connected to the comparator 31, and it stores logic values 35 corresponding to address marks, for example, in sixteen bits, associated with the beginnings of the ID fields ID1 and ID2, respectively. That is, the memory 33 stores the bitwise logic value corresponding to the address mark AM.

The shift register 3 is connected to the comparator 31, and it stores each of the plurality of bits of read data RD input from the input side and outputs the read data RD to the output side. More specifically, the shift register 3 stores input read data RD while shifting it bit by bit in synchronization with the playback clock DCK, and outputs read data RD having been stored by shifting it bit by bit.

The comparator 31 is connected to the shift register 3 and to the memory 33. The comparator 31 bitwise compares the read data RD stored in the shift register 3 and the logic values 35 corresponding to the address mark AM, stored in the memory 33. When the comparison results in coincidence, the comparator 31 recognizes that the read data RD includes the logic values 35 corresponding to the address mark AM, outputting an address mark detection signal AMS indicating the presence of the logic values corresponding to the address mark AM.

Thus, the comparator 31 determines whether the read data RD includes the logic values 35 corresponding to the address mark AM not only by the first detection criterion of whether a combination of space length and mark length corresponding to the address mark AM is present.

Accordingly, even if, for example, bit errors occur at three points A, B, and C, as shown in FIG. 6B, or if bit errors occur at two points D and E, as shown in FIG. 6C, generating a false address mark AMO, the optical disk apparatus 100 determines that the logic values corresponding to the false address mark AMO differ from those of the true address mark AM, and thus does not incorrectly detect the false address mark AMO as the true address mark AM.

Thus, the optical disk apparatus 100 does not detect the false address mark AMO and does accurately detect the portion coinciding with the logic values corresponding to the true address mark AM. Accordingly, the optical disk apparatus 100 accurately detects the address mark AM shown in FIG. 3 from the address portion 124 in the optical disk 6 shown in FIG. 2.

The optical disk 6 and the optical disk apparatus 100 are constructed as described above, and the description will now be directed to an example operation of the optical disk apparatus 100 with reference to FIGS. 1 to 6C. Description of the operation of the servo system in the optical disk apparatus 100 will be omitted.

In the optical disk apparatus 100, for example, the spindle motor 9 rotates the optical disk 6 at a predetermined rotation rate. On the optical disk 6, for example, groove regions G and land regions L are alternately disposed, as shown in FIG. 2. The optical pickup 7 irradiates the groove areas G, etc. of the rotating optical disk 6 with a laser beam, detecting the sector space SM shown in FIG. 2 based on reflected light. The sector space SM serves to recognize the beginning of a sector.

When the optical pickup 7 detects the sector space SM, the optical disk apparatus 100 recognizes that the current position is the beginning of a sector, and then detects an ID field ID-G, etc. subsequent to the sector space SM in the sector.

The ID field ID-G, etc. is, for example, in the sector format shown in FIG. 3. The optical pickup 7 leads in PLL based on the VFO field VFO1, achieving synchronization for the VHF in the PLL unit 14 described earlier.

The optical pickup 7 detects the address mark AM as follows, while it is in synchronization achieved by the VFO. The address mark AM consists of, for example, a first recording pulse sequence 106 of a mark length with a pulse width of 6T and a second recording pulse sequence of a space length with a pulse width of 9T, as shown in FIG. 6A. In the following description, an address mark detected correctly will be referred to as "true address mark AM," while an address mark incorrectly detected will be referred to as "false address mark AMO."

The recording pulse sequences shown in the lower parts of FIGS. 6A to 6C are obtained by NRZI modulating the bit sequences of variable-length codes shown in the associated upper parts, respectively. In NRZI modulation, the logic level alternates between logic levels (corresponding to spaces and marks) each time a "1" is detected in the bit sequence whereas the logic level is maintained while "0"s are being detected in the bit sequence.

Thus, in the optical disk 6 characteristic of this embodiment, recording data obtained by NRZI modulating recorded data in the form of, for example, RLL (2,7) codes is recorded in the preformatted area (address portion 124), i.e., the VFO fields VFO1 and VFO2, the address mark AM, and the ID fields ID1 and ID2. According to this configuration, the pulse widths of the first recording pulse sequence 106 and the second recording pulse sequence 109 can be made longer, facilitating distinction from other recording pulse sequences. Thus, the address mark AM is accurately detected, and a margin is provided at the time of playback. Furthermore, similarly, recording data obtained, for example, by RLL (1, 7) coding and NRZI modulation (PWM) is recorded in the rewritable area (data portion 126).

The detection of the address mark AM by the optical disk apparatus 100 is characterized in that the detection is based on the second detection criterion as well as the first detection criterion.

More specifically, regarding the first recording pulse sequence 106 and the second recording pulse sequence 109, the logic values in addition to the combination of mark length and space length are detected. That is, the logic values in the mark length and the logic values in the space length are also detected. Thus, the first recording pulse sequence 106 and the second recording pulse sequence 109 can be considered as being represented by pulse width modulation with considerations to the logic values of the mark length and the space length.

The address mark AM is supposed to be a recording pulse sequence, for example, as shown in FIG. 6A. However, let it be supposed, for example, that bit errors occurred at points A, B, and C, as shown in FIG. 6B, so that a false address mark AMO is present, which is a recording pulse sequence having the same combination of mark length and space length as the true address mark AM.

The optical disk apparatus 100 detects the address mark AM having the combination of a mark length with a pulse width of 6T and a space length with a pulse length of 9T based on the first detection criterion. The optical disk apparatus 100 further detects the logic values of all the bits associated with the mark length having a pulse width of 6T and the space length having a pulse width of 9T constituting the address mark AM based on the second detection criterion. Thus, the optical disk apparatus 100 readily recognizes that the false address mark AMO shown in FIG. 6B differs from the true address mark AM shown in FIG. 6A. Thus, the optical disk apparatus 100 does not incorrectly detect the false address mark AMO shown in FIG. 6B as the true address mark AM, and does detect the subsequent true address mark AM accurately.

Let it be supposed that, for example, bit errors occurred at two-points D and E as shown in FIG. 6C, so that a false address mark AMO is present, which is a recording pulse sequence having the same mark length and space length as the true address mark AM.

The optical disk apparatus 100 similarly detects the address mark AM having the combination of a mark length with a pulse width of 6T and a space length with a pulse length of 9T, and also detects the logic values of all the bits of the mark length having a pulse width of 6T and the space length having a pulse width of 9T constituting the address mark AM. Thus, the optical disk apparatus 100 readily recognizes that the false address mark AMO shown in FIG. 6C differs from the true address mark AM shown in FIG. 6A.

In this case, as opposed to the previous example, since the false address mark AMO partially overlaps the true address mark AM, the true address mark AM will not be detected in the range shown in FIG. 6C. However, since the optical disk 6 includes another address mark AM as shown in FIG. 3, the optical disk apparatus 100 is able to accurately detect the other address mark AM based on the first detection criterion and the second detection criterion.

Generally, in detecting the address mark AM, the optical disk apparatus 100 generates a detection window, regarding only a pattern detected within the window, corresponding to the address mark AM, as the address mark AM. The detection window is usually set to be narrow, so that an incorrect detection of address mark AM rarely occurs. However, the optical disk apparatus 100 sometimes sets a wider detection window, for example, when the address mark AM is desired to be detected even in case where the sector space SM cannot be detected, or when the position of the detection window cannot be precisely controlled.

In such cases, the arrangement may be such that, if a portion or the entirety of a recording pulse sequence detected as a presumable address mark in the wider detection window is included in the VFO fields VFO1 and VFO2 (other areas) preceding the address mark AM shown in FIG. 3, the optical disk apparatus 100 determines that the recording pulse sequence detected as a presumable address mark is not the address mark AM. Accordingly, even if the address mark AM is detected including the VFO field VFO1, the optical disk apparatus 100 does not incorrectly determine a bit sequence having the same logic values as the address mark AM as the address mark AM, achieving even more accurate detection of the address mark AM.

Furthermore, in this case, a bit having a logic value of "1", associated with the VFO field VFO1, etc. and nearest to the address mark AM, a bit having a logic value of "1", associated with the address mark AM and nearest to the VFO field VFO1, etc., and bits having logic values of "0"s therebetween constitute the first recording pulse sequence 106 having a pulse width of, for example, 6T ("1000001").

Accordingly, even if a bit sequence having the same pulse width as the pulse width 6T of the first recording pulse sequence 106 partially overlaps a bit sequence including the VFO field VFO1, etc., the optical disk apparatus 100 accurately detects the address mark AM.

Based on the address mark AM thus detected accurately, the optical pickup 7 reads information regarding, for example, sector address, i.e., track number and sector number, and a CRC byte for detecting error in the information, from the ID fields ID1 and ID2.

Then, in the laser adjustment field ALPC shown in FIG. 4, the power of laser beam is adjusted to stable state. The VFO field VFO3 leads in PLL, serving to achieve synchronization for the VFO in the PLL unit 14. Furthermore, the presync field PreSync is detected, achieving synchronization for the sync field Sync. Then, the Sync field is detected to achieve synchronization for the data field DF, so that the optical pickup 7 is allowed to accurately read user data recorded in the data field DF.

According to the preferred embodiment of the present invention, the address mark AM is detected based on the second detection criterion as well as the first detection criterion, so that an incorrect detection of the address mark AM due to defect in the VFO field VFO1, etc. or due to dust is prevented without increasing redundancy in the optical disk 6, achieving accurate detection of the address mark AM.

Furthermore, according to the embodiment described above, data is recorded in the address portion 124 using RLL (2, 7) codes, which makes the embodiment further advantageous in the following respect. In recent years, when a stamper for creating the optical disk 6 as a medium is manufactured, formation of pits has become more and more difficult due to narrower tracks and higher density. Forming a minimum mark length by using the RLL (2, 7) codes serves to form a stamper stably. Thus, use of the RLL (2, 7) codes also serves to provide a margin for reading ID fields stably.

Thus, according to this embodiment, the optical disk apparatus 100 accurately detects the address mark shown in FIG. 3 from the optical disk 6, achieving better performance of reading the ID fields ID1 and ID2 subsequent to the address mark AM in the ID fields ID-G and ID-L of the address portion 124. Thus, according to this embodiment, the optical disk apparatus 100 maintains a good performance of reading from the optical disk 6.

Furthermore, according to this embodiment, the address mark AM shown in FIG. 3 is accurately detected from FIG. 6, so that writing of data to the data portion 126 of the optical disk 6 is started at an accurate position, which serves to improve performance of the optical disk apparatus 100.

Furthermore, according to this embodiment, performance of reading the ID field ID1, etc. shown in FIG. 3 from the optical disk 6 is improved, so that special processing for improving reading performance need not be applied to the optical disk 6, which serves to improve yield of the optical disk 6 and to reduce manufacturing cost of the optical disk 6.

The present invention is not limited to the embodiment described above.

In the embodiment described above, the address mark AM has been described, by way of example, as a pattern including a combination of the first recording pulse sequence 106 having a pulse width of 6T and the second recording pulse sequence 109 having a pulse width of 9T. For example, the pulse width of the first recording pulse sequence 106 is preferably in a range of 5T to 9T, and the pulse width of the second recording pulse sequence is preferably 9T.

This is because of the following reason. For a synchronization mark such as the address mark AM, a prohibited code pattern is desirably used in order to suppress incorrect detection. For example, the second recording pulse sequence 109 having a pulse width of 9T, i.e., the maximum pulse width (maximum run) of RLL (2, 7) codes 8T+1T, has little influence on the reading clock. A pulse width longer than 9T is not appropriate for the second recording pulse sequence 109 because the PLL led in based on the second recording pulse sequence 109 may be unlocked, inhibiting reading of the subsequent ID field ID1, etc. This also applies to the first recording pulse sequence 106.

On the other hand, a pulse width shorter than the minimum run (e.g., a pulse width of 2T in the case of RLL (2, 7) codes) is not desirable for the first recording pulse sequence 106 or the second recording pulse sequence 109, because formation of bits themselves becomes difficult and margin at the time of playback is possibly reduced.

Furthermore, the pulse width of the first recording pulse sequence 106 is set to 5T or longer because, for example, 16 channel bits of "0000100000000100" including "100" having a pulse width of 3T at the end is suitable as the address mark AM, and the beginning portion "00001" (5T) and a preceding region are taken into consideration. Furthermore, the address mark AM ends in "100" because the next bit is the first bit of a demodulation pattern, which is characteristic of a modulation/demodulation table of, for example, RLL (2, 7) codes. That is, by using "100" (3T) at the end of the address mark AM, the subsequent bits can be demodulated without influence of the preceding bits.

In view of the above, considering further that the address mark AM consists of, for example, one byte in format and that a region (VFO field) preceding the address mark constituting a detection pattern is also taken into consideration for detection, for example, in case of RLL (2, 7) codes, since one byte corresponds to 16 channel bits, the address mark AM is desirably selected from a range between a pattern consisting of a first recording pulse sequence 106 having a pulse width of 5T and a second recording pulse sequence 109 having a pulse width of 9T and a pattern consisting of a first recording pulse sequence 106 having a pulse width of 9T (maximum run of 8T+1T) and a second recording pulse sequence 109 having a pulse width of 9T.

The optical disk 6 may employ, for example, magneto-optical recording, phase-change recording, MSR (Magnetic Super Resolution), LIMDOW (Light Intensity Modulation Direct OverWrite), or WORM (phase-change recording, abrasive, or alloy).

Furthermore, although the embodiment has been described, by way of example, in relation to a case where a logic HIGH level (first logic level) corresponds to a space and a logic LOW level (second logic level) corresponds to a mark, it is to be understood that, without limitation thereto, the arrangement may be such that a logic LOW level corresponds to a space and a logic HIGH level corresponds to a mark.

The components of the embodiment described above may be partially omitted or combined in a different manner as desired.

What is claimed is:

1. An optical disk having a plurality of sectors constituting tracks arranged spirally or concentrically, each of the plurality of sectors including:
    a recording region for recording user data; and
    a header region for recording address information including at least one address information start mark for synchronizing with a beginning of address information regarding the position of the sector, the address information start mark being represented by a sequence of pulses having a first logic level and pulses having a second logic level which is an inverse of the first logic level;
    wherein the address information is recorded in the header region primarily based on variable-length codes such that, between each pair of nearest bits having a first logic value, at least two and at most seven bits having a second logic value are disposed, the address information start mark being recorded based on either a code permitted for the rest of the address information or a code not permitted for the rest of the address information,
    and the address information start mark is detected based on a first detection criterion that a combination of pulse widths each defined in association with a nearest pair of bits having the first logic value is present in a pulse sequence, and also based on a second detection criterion that, when the logic level of the pulse sequence alternates between the first logic level and the second logic level in association with occurrence of each of a plurality of bits having the first logic value intermittently disposed among a plurality of bits having the second logic value, the logic levels of a number of pulses in the pulse sequence respectively coincide with the logic levels of the corresponding pulses constituting the combination of pulse widths.

2. An optical disk according to claim 1, wherein a pulse width of contiguous pulses having the first logic level is in a range of five to nine units of the pulse width of a single pulse having the first logic level, and a pulse width of contiguous pulses having the second logic level is nine units of the pulse width of a single pulse having the second logic level.

3. An optical disk according to claim 1, wherein whether the combination of pulse widths is present is determined with consideration also given to the logic levels of pulses associated with a region preceding the address information start mark.

4. An optical disk according to claim 3, wherein a pulse having the first logic level, associated with the preceding region and nearest to pulses associated with the address information start mark, and a pulse having the first logic level, associated with the address information start mark and nearest to pulses associated with the preceding region, are separated by five units of the pulse width of a single pulse having the second logic level,
    and the address information start mark consists of one byte in total.

5. An optical disk apparatus for playing back data from an optical disk having a plurality of sectors constituting tracks formed spirally or concentrically, each of the plurality of sectors including:
    a recording region for recording user data; and
    a header region for recording address information including at least one address information start mark for synchronizing with a beginning of address information regarding the position of the sector, the address information start mark being represented by a sequence of pulses having a first logic level and pulses having a second logic level which is an inverse of the first logic level;
    the optical disk detecting the address information start mark from the header region of the optical disk, and playing back the user data recorded in the recording region based on the address information obtained by synchronizing with the detected address information start mark,
    wherein the address information start mark is detected based on a first detection criterion that a combination of pulse widths each defined in association with a nearest pair of bits having the first logic value is present in a pulse sequence, and also based on a second detection criterion that, when the logic level of the pulse sequence alternates between the first logic level and the second logic level in association with occurrence of each of a plurality of bits having the first logic value intermittently disposed among a plurality of bits having the second logic value, the logic levels of a number of pulses in the pulse sequence respectively coincide with the logic levels of the corresponding pulses constituting the combination of pulse widths.

6. An optical disk apparatus according to claim 5, wherein a pulse width of contiguous pulses having the first logic level is in a range of five to nine units of the pulse width of a single pulse having the first logic level, and a pulse width of contiguous pulses having the second logic level is nine units of the pulse width of a single pulse having the second logic level.

7. An optical disk apparatus according to claim 5, wherein whether the combination of pulse widths is present is determined with consideration also given to the logic levels of pulses associated with a region preceding the address information start mark.

8. An optical disk apparatus according to claim 6, wherein a pulse having the first logic level, associated with the preceding region and nearest to pulses associated with the address information start mark, and a pulse having the first logic level, associated with the address information start mark and nearest to pulses associated with the preceding region, are separated by five units of the pulse width of a single pulse having the second logic level,
    and the address information start mark consists of one byte in total.

* * * * *